United States Patent [19]

Kawada et al.

[11] Patent Number: 4,703,384
[45] Date of Patent: Oct. 27, 1987

[54] MAGNETIC TAPE CASSETTE WITH REEL-LOCK MECHANISM

[75] Inventors: Hideaki Kawada; Kazuo Ike, both of Kanagawa; Tsuneo Nemoto; Kiyoshi Omori, both of Miyagi, all of Japan

[73] Assignee: Sony Corporation, Tokyo, Japan

[21] Appl. No.: 756,246

[22] Filed: Jul. 18, 1985

[30] Foreign Application Priority Data

Jul. 21, 1984 [JP] Japan ................. 59-151498

[51] Int. Cl.$^4$ ............ G11B 15/32; G03B 1/04
[52] U.S. Cl. .................... 360/132; 242/198; 360/94
[58] Field of Search ........... 360/132, 94; 242/198, 242/199

[56] References Cited

U.S. PATENT DOCUMENTS

| | | | |
|---|---|---|---|
| 4,022,401 | 5/1977 | Kishi | 242/198 |
| 4,106,724 | 8/1978 | Higashida | 242/198 |
| 4,288,048 | 9/1981 | Sieben | 242/198 |
| 4,320,422 | 3/1982 | Rinkleib | 360/132 |
| 4,399,481 | 8/1983 | Loranger et al. | 360/132 |
| 4,447,020 | 5/1984 | Toi et al. | 242/198 |
| 4,512,534 | 4/1985 | Coy, Jr. et al. | 242/198 |
| 4,513,929 | 4/1985 | Oishi et al. | 360/132 |
| 4,553,717 | 11/1985 | Takagi | 360/132 |
| 4,572,461 | 2/1986 | Horikawa et al. | 360/132 |

FOREIGN PATENT DOCUMENTS

| | | | |
|---|---|---|---|
| 57-58272 | 4/1982 | Japan | 360/132 |
| 58-7510 | 2/1983 | Japan | |
| 58-114578 | 8/1983 | Japan | |

Primary Examiner—John H. Wolff
Assistant Examiner—Matthew J. Bussan
Attorney, Agent, or Firm—Lewis H. Eslinger; Alvin Sinderbrand

[57] ABSTRACT

A tape cassette is provided with a slider serving as a reel lock releasing element and which is movable in the front-to-rear direction near the rear of the cassette, along a path defined by a guide. A guide groove is formed in the underside of the cassette in alignment with the guide for the slider. The slider has a downward projection extending into the guide groove through an elongated opening in the guide. The downward projection is abutted by a projection built into the playback unit, and which is received in the guide groove for guiding the cassette during its insertion into the playback unit or VTR. Therefore, insertion of the cassette causes the cassette guiding projection to displace the slider for releasing the tape reels.

12 Claims, 8 Drawing Figures

MAGNETIC TAPE CASSETTE WITH REEL-LOCK MECHANISM

BACKGROUND OF THE INVENTION

The present invention relates generally to a magnetic tape cassette, especially to a tape cassette for a video tape recorder. More specifically, the invention relates to a reel-lock mechanism for locking the tape reels in tape cassettes of any size.

As is well known, tape cassettes, especially tape cassettes for video tape recorders, which will be hereafter referred to as "VTR tape cassette", can accommodate various lengths of magentic tape, such as VTR tapes, within cassette casings of a single size designed to accommodated the longest desired length of magnetic tape. This necessarily leaves unnecessary empty space when a relatively short tape is housed in the cassette cover.

In the recent years, portable VTR systems have strived to be as compact as possible. This consideration naturally applies also to VTR tape cassettes. To satisfy this requirement, one approach has been to provide cassette casings of various sizes accommodating specific lengths of tape wound onto tape reels of a corresponding diameter. For instance, for a short tape, such as for a 10-minute recording, a small-diameter tape reel is used. In this case, a small cassette casing which will be referred to hereafter as "S size cassette cover" is used for housing the small-diameter tape reel. For a longer tape, such as for a 90-minute recording, a large-diameter tape reel and a large cassette casing, which is referred to as "L-size cassette casing", are used. Similarly, for a medium-length tape, such as for a 60-minute recording, a medium-diameter tape reel and medium-size cassette casing, which will be referred to as "M size cassette casing", are used.

Tape drive systems intended for use with various sizes of the tape reels and cassette casings must be adapted to deal with a broad range of cassette casing and tape handling requirements. For example, VTR systems capable of handling various sizes of VTR tape cassettes employ adjustable reel bases capable of driving tape reels of various sizes.

Such tape cassette product lines also require reel lock mechanisms for preventing the tape reels from rotating while the tape cassettes are not in use. Japanese Utility Model Publication (Jikko) Showa No. 58-7510, published on Feb. 9, 1983, discloses a tape reel lock mechanism in which the tape reels are released to be free to rotate by a vertical pin within the play-back unit, such as, a VTR player. A similar pin-actuated reel lock release has also been disclosed in Japanese Utility Model First Publication (Jikkai) Showa No. 58-114578, published on Aug. 5, 1983. When such conventional reel lock release mechanisms are adapted for use with tape cassettes of various sizes, a plurality of lock-release pins are required on the play-back unit. For instance, when S-, M-, L-size cassettes are all to be used, three lock-release pins are required due to different positions of the reel lock mechanisms of the different cassettes. In this case, the L-size cassette must have two extra holes simply to accommodate the pins for reel lock release for S- and M-size cassettes. To allow for the hole accommodating the pin for reel lock release for S-size cassettes, the tape reels of an L-size cassette must be inconveniently separated.

SUMMARY OF THE INVENTION

The present invention is intended to facilitate use of various sizes of tape cassettes without the problems encountered in the conventional art.

Therefore, it is an object of the present invention to provide a tape cassette with a reel lock mechanism which does not require a lock-release pin extending into the tape cassette.

Another object of the invention is to provide a reel lock mechanism which is unlocked when the tape cassette is inserted into a cassette holder of a recording and reproducing apparatus, such as a VTR player.

In order to accomplish these and other objects, a tape cassette, according to the present invention, is provided with a slider serving as a reel lock releasing means. The slider is movable in the front-to-rear direction near the rear of the cassette, along a path defined by a guide. A guide groove is formed in the underside of the cassette opposite the guide for the slider. The slider has a downward projection extending into the guide groove through an elongated opening through the guide. The downward projection abuts a projection built into the playback unit, which is received in the guide groove. Movement of the cassette in the inserting direction causes the projection of the playback unit to push the projection of the slider rearward, whereby the tape reels are released. Specifically rearward movement of the slider causes movement of a reel lock lever in a lock-release direction.

According to one aspect of the invention, a magnetic tape cassette comprises a cassette casing, a pair of tape reels onto which a magnetic tape is wound, first locking members cooperating with the tape reels for rotation therewith, a pair of second locking members, each cooperating with a respective one of the first locking members to establish locking engagement with the latter so as to prevent the tape reels from rotating, the second locking members being pivotable in a first direction to establish the locking engagement and in a second direction to release the locking engagement, a biasing means biasing the second locking members in the first direction, and lock releasing means cooperating with the second locking members to actuate the second locking members in the second direction, the lock releasing means having a projection projecting downwardly through the floor of the cassette casing, the projection being so arranged as to cooperate with a recording and reproducing apparatus so as to actuate the lock releasing means for moving the second locking members in the second direction when the tape cassette is loaded into the recording and reproducing apparatus.

According to another aspect of the invention, a magnetic tape cassette comprises a cassette casing having a groove in the center of its lower surface extending front-to-rear, a pair of tape reels housed within the cassette casing at opposite sides of the groove, each of the tape reels having a hub onto which a magnetic tape is wound and a circular flange with a plurality of locking teeth aligned about its periphery, a pair of locking levers pivotable about a pair of pivot pins resting on th floor of the cassette casing at opposite sides of the groove, each of the locking levers pivoting between a locking position in which it fixedly engages the locking teeth of a corresponding one of the tape reels and an unlocking position wherein it is released from the locking teeth so as to permit rotation of the tape reel, a slider provided near the rear end of the groove and having a downward projection extending into the groove, the slider being free to move between a first position corresponding to the locking position of the locking levers and a second position corresponding to the unlocking position of the locking levers, the projection cooperating with an actuation member in a recording and reproducing apparatus to move the slider to the second position when the tape cassette is loaded into the recording and reproducing apparatus.

BRIEF DESCRIPTION OF THE DRAWINGS

The present invention will be understood from the detailed description given herebelow and from the accompanying drawings of the preferred embodiments of the invention, which, however, should not be taken to limit the invention to the specific embodiments but are for explanation and understanding only.

In the drawings:

FIGS. 5A and 5B are sections similar to FIG. 3, but showing the second embodiment of reel lock mechanism according to the invention, in which FIG. 5A shows the reel lock mechanism in its locked position, and FIG. 5B shows the reel lock mechanism in its released position;

DESCRIPTION OF THE PREFERRED EMBODIMENT

Figure 1:
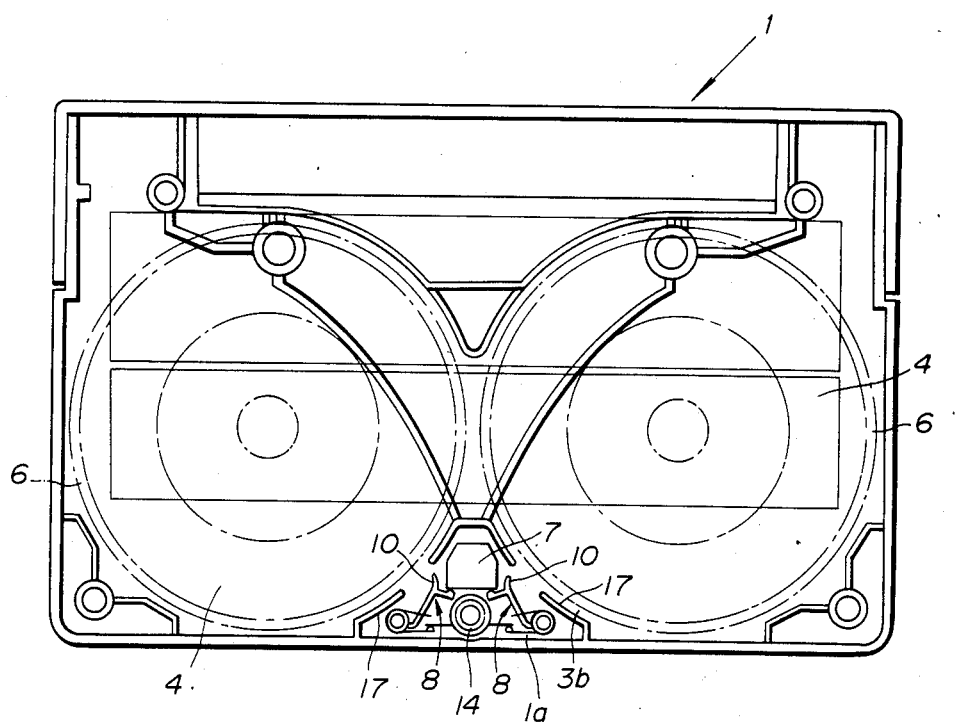
FIG. 1 is a plan view of the first embodiment of a tape cassette according to the invention, which is shown with the upper wall or panel of the cassette casing removed in order to show the internal structure.
Figure 2:
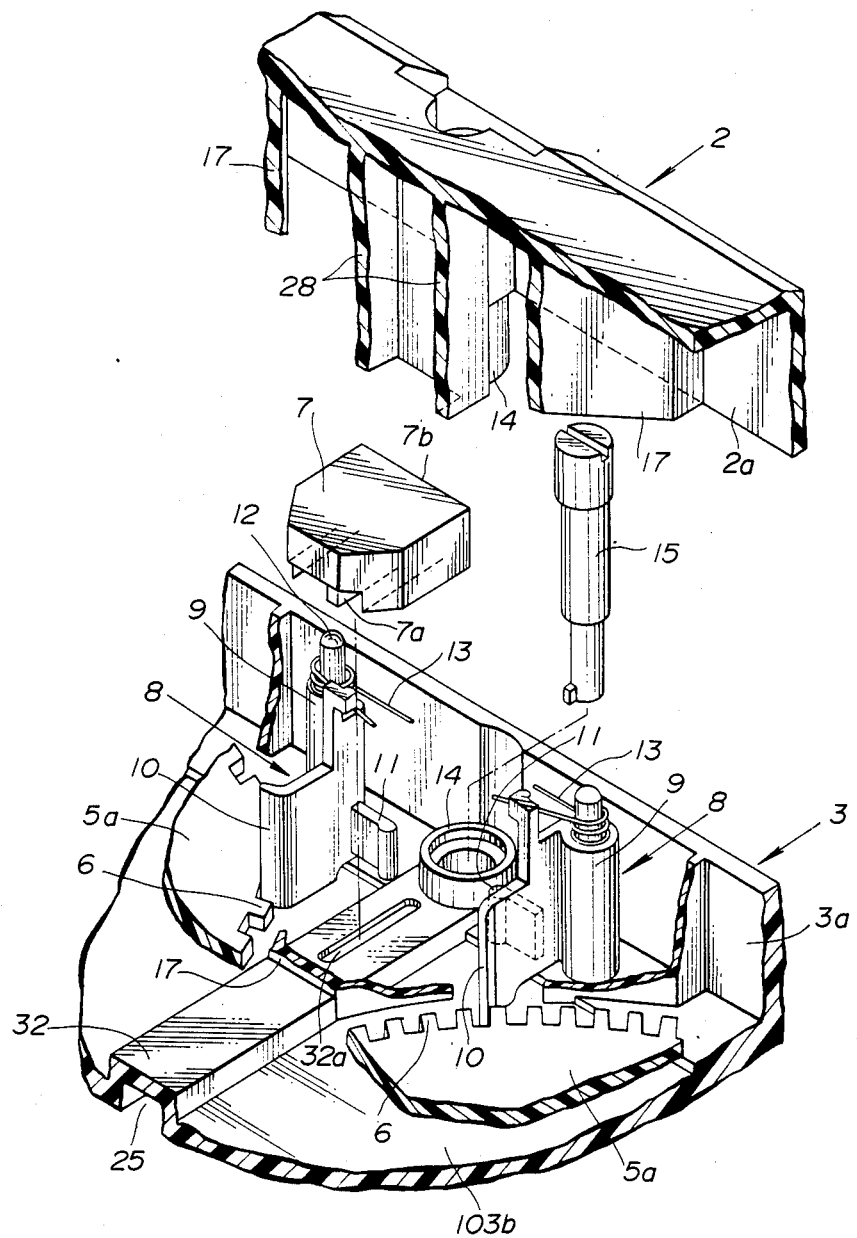
FIG. 2 is an exploded perspective view of the first embodiment of the reel lock mechanism of FIG. 1.

Referring now to the drawings, particularly to FIGS. 1 to 4, a tape cassette casing 1 comprises an upper half 2 and a lower half 3. A pair of tape reels 5 are housed in the tape cassette casing 1. Each of the tape reels 5 has a lower flange 5a which has locking teeth 6 arranged about its periphery. The upper and lower casing halves 2 and 3 are formed with mating ribs 17. The ribs 17 are located near the rear of the cassette casing, i.e. remote from the tape-access window, and are integral to the rear walls 2a and 3a of the upper and lower halves 2 and 3. The ribs 17 have sections curved so as to be concentric to the tape reels 5. The ribs 17 and the rear walls 2a and 3a of the upper and lower halves 2 and 3 define a space 1a within the cassette casing 1.

A slider 7 on the floor 3b of the lower casing half 3 is free to slide forward and rearward along a guide projection 32 extending from the floor. The guide projection 32 comprises an upward impression extending upwardly from the floor. The impression, in turn, defines a guide groove 25 extending frontward and rearward, that is, perpendicularly to the rear walls 2a and 3a. The slider 7 has a downward projection 7a extending through an elongated slot 32a into groove 25. The guide groove 25 also receives an upward projection provided in the recording and reproducing apparatus, such as, a VTR player. In practice, the upward projection is provided on the floor of a cassette holder in the recording and reproducing apparatus and extends frontward and rearward at the transverse center of the cassette holder so as to engage in groove 25 when the cassette casing 1 is inserted in the cassette holder.

A pair of reel lock levers 8 are located at opposite sides of the slider 7. Each of the reel lock levers 8 has a boss section 9, a locking claw 10 and a transverse strip or actuating on 11. The boss section 9 of the reel lock lever 8 pivotably engages a pivot pin 12 formed integrally with the lower casing half 3 and extending upwardly from its floor 3b. A torsion spring 13 is wound around the pin 12. One end of the torsion spring 13 is seated on a pin or projection 13a extending from the upper casing half 2. The other end of the torsion spring 13 is seated on a projection 13b extending from the locking claw 10. Thus, the torsion spring 13 exerts a biasing force in the direction a of FIG. 3 on the locking claw 10. In the position shown in FIG. 3, which shows the tape cassette when not in use, the tape reel lock mechanism engages the tape reels 5 to prevent rotation of the latter. The position illustrated in FIG. 3 will be referred to hereafter as "reel locking position". In this reel locking position, the free end of each transverse strip 11 contacts with the rear edge 7a of the slider 7.

Hollow cylindrical extensions 14 are formed on the upper and lower casing halves 2 and 3. The extensions 14 of the upper and lower covers 2 and 3 are aligned with each other and form a hollow cylindrical shell when the casing halves 2, 3 engage. A tape condition indicative plug 15 is accommodated within the extensions 14. The position of the plug 15 within the extensions 14 indicates tape conditions, such as prerecorded or blank, etc. The plug position may be detected by an appropriate plug position detecting means built in a play-back unit, such as a VTR. For example, a conventional detector pin 16 in the VTR system can be used as plug position detecting means.

Figure 3:
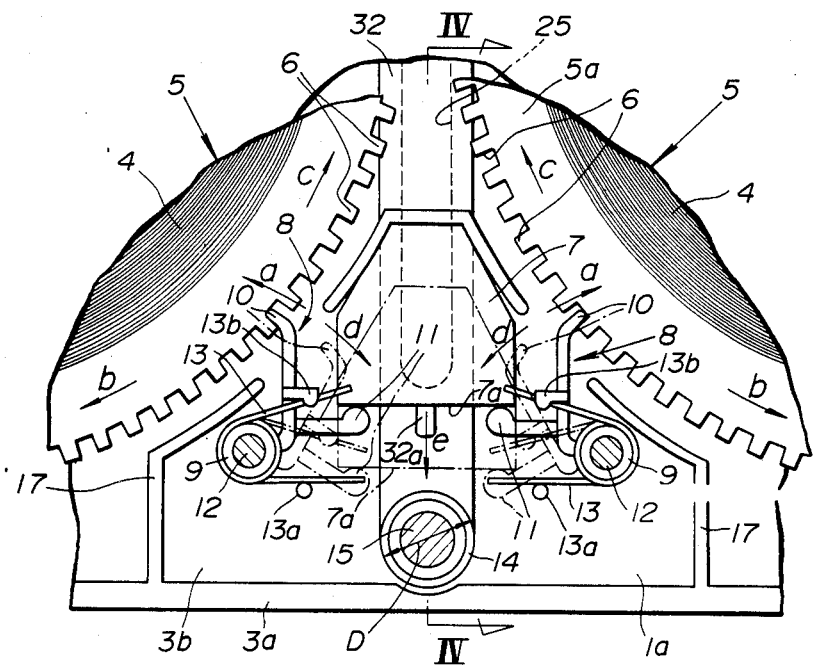
FIG. 3 is an enlarged plan view of part of the tape cassette of FIG. 1, showing the first embodiment of a reel lock mechanism according to the present invention.
Figure 4:
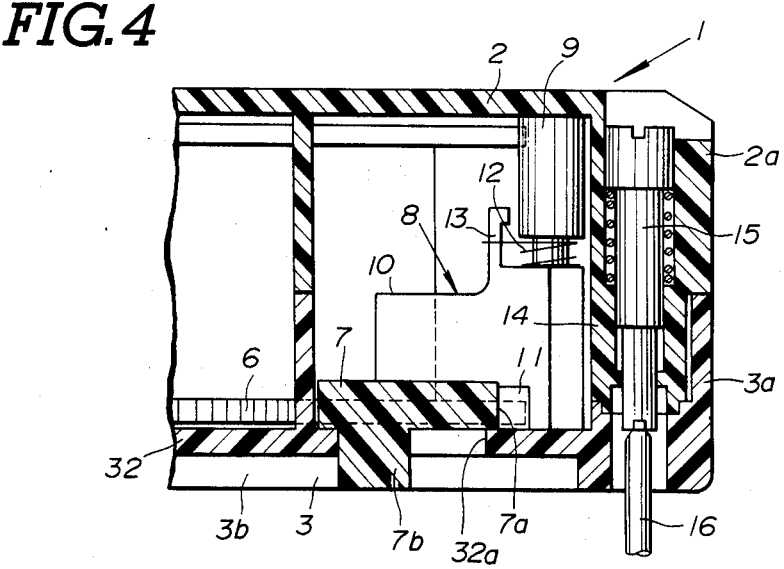
FIG. 4 is a section taken along line IV—IV of FIG. 3.

In the reel lock position of FIG. 3, when rotational force is applied so as to tighten the tape as shown by the arrows c, the locking claws 10 are kicked out of engagement in the direction d against the spring force of the torsion springs 13 so as to allow tape reel rotation. When the force is released, the locking claws 10 are re-engaged to prevent unwanted loosening.

When the tape cassette is loaded into a play-back unit, e.g. a VRT, the slider 7 engages an appropriate reel lock releasing means (not shown). The reel lock release means moves the slider 7 rearward as shown by the arrow e in FIG. 3. Rearward movement of the slider 7 exerts a force on the transverse strips 11 in the direction d so as to release the locking claws 10 from the locking teeth 6. Therefore, the tape reels become free to rotate in either direction.

FIGS. 5A, 5B, 6 and 7 show the second embodiment of the tape cassette according to the present invention. In this second embodiment, a slider 120 is formed with a cut-out 121 in its rear edge. The cut-out 121 is wider than the diameter D of cylindrical extensions 114 receiving the tape condition indicative plug 115. The cut-out 121 is essentially square. Outward-projecting tabs 122 at the ends of the rear edge of the slider 120 form part of the reel lock release mechanism. The lower surface of the slider 120 also has a central cut-out 123 which extends from the cut-out 121 to its forward edges (refer to FIG. 6). The width of the cut-out 123 is essentially the same as that of the cut-out 121. A guide pin 124 extends downwards from the upper wall of the slider 120 through the cut-out 123.

The lower surface of the floor 103b of the lower casing half 103 of the cassette casing 101 has a laterally centered elongated guide groove 125 extending front-to-rear. The guide groove 125 is reflected in a raised impression 126 extending front-to-rear along the floor 103b inside the casing. The cut-out 123 of the slider 120 engages the impression 126 so as to be free to slide therealong. An elongated hole 127 is formed through the impression 126. The guide pin 124 of the slider 120 extends through the elongated hole 127 so that its lower end projects into the guide groove 125.

The upper face of the slider 120 contacts a rib 128 formed integrally with the upper casing half 102. The rib 128 thus restricts upward movement of the slider 120.

As in the foregoing first embodiment, a pair of locking levers 108 lie at opposite sides of the slider 120. Transverse strips 111 of the locking levers 108 are in contact with the rear end of the slider 120. The locking levers 108 also have locking claws 110 engaging the locking teeth 106 of the flanges 105a of the tape reels 105. Boss sections 109 of the locking levers 108 rotatably engage pivot pins 112. Torsion springs 113 bias the locking levers 108 so as to normally establish locking engagement between the locking claws 110 and the locking teeth 106.

Figure 7:
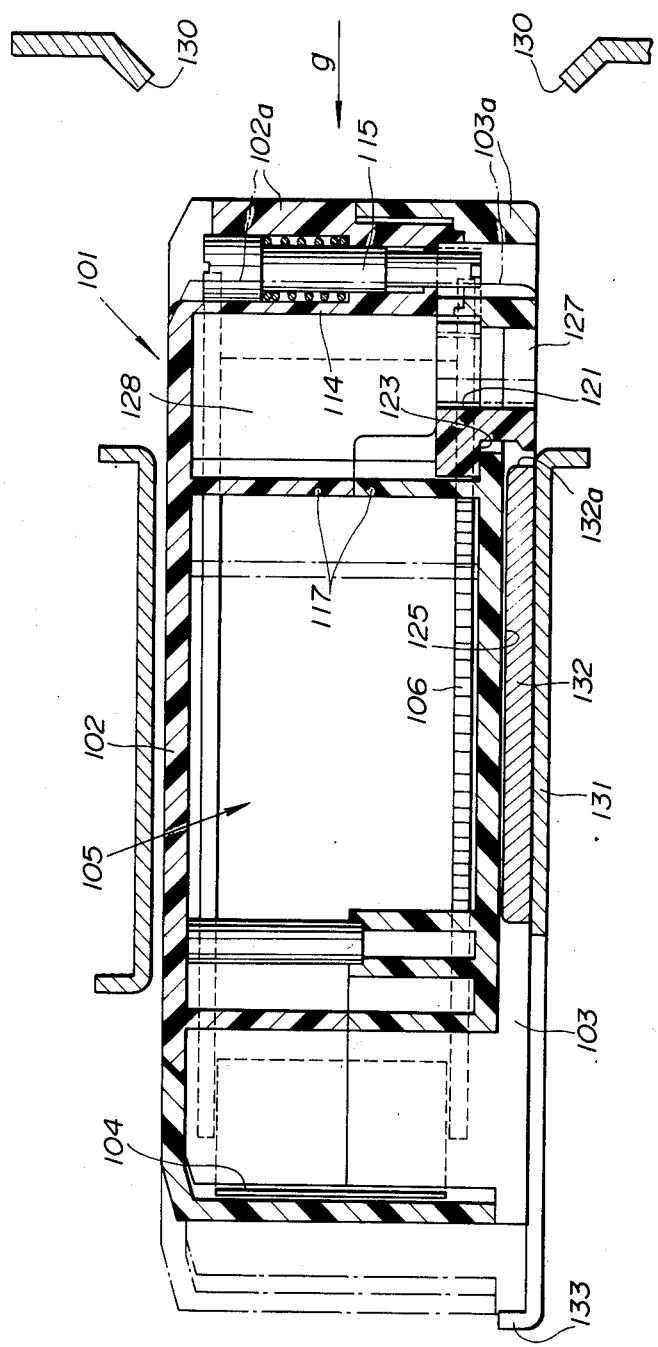
FIG. 7 is a cross-section through the second embodiment of the tape cassette as loaded in an associated play-back unit, such as a VTR.

When the tape cassette constructed according to the foregoing second embodiment is loaded into the playback unit, such as a VTR, in the direction of the arrow g in FIG. 7 through its front access opening 130, the tape cassette is received by a cassette holder 131 of the VTR. The laterally centered guide groove 125 in the floor of the lower casing half 103 engages a similarly laterally centered guide 132 projecting from the upper surface of the floor of the cassette holder 131. In the course of such loading, rear end 132a of the guide 132 abuts the lower end of the guide pin 124. As the tape cassette moves in the direction g, the guide pin 124 is driven rearward with the slider 120 to the position shown in FIG. 5B. In the position of FIG. 5B, the cylindrical extensions 114 lie within the essentially square cut-out 121 in the slider 120. During this movement in the direction of the arrow g, the slider 120 displaces the transverse sections 111 of the locking levers 108 in the lock-release direction. This causes pivotal movement of the locking levers 108 in the direction d. Therefore, the locking claws 109 release from the locking teeth 106.

Figure 5A:
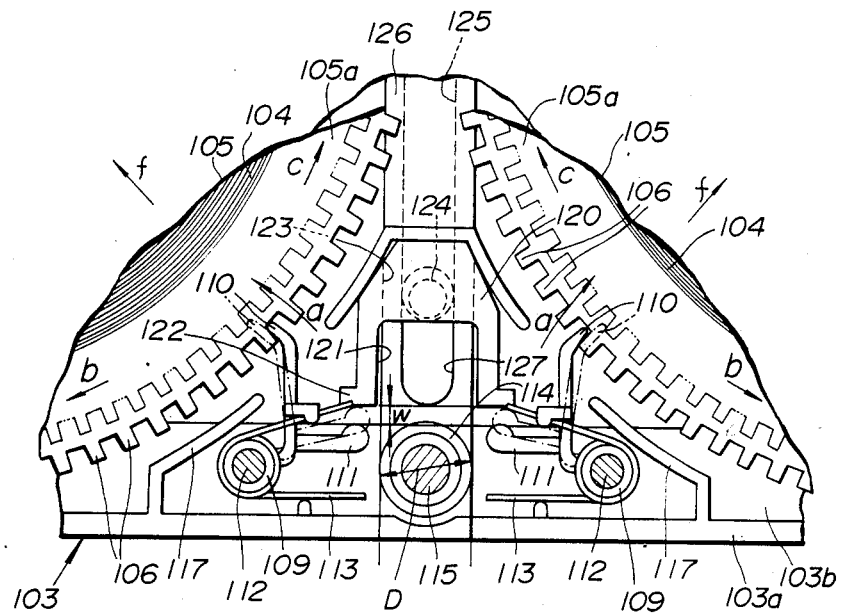
Figure 5B:
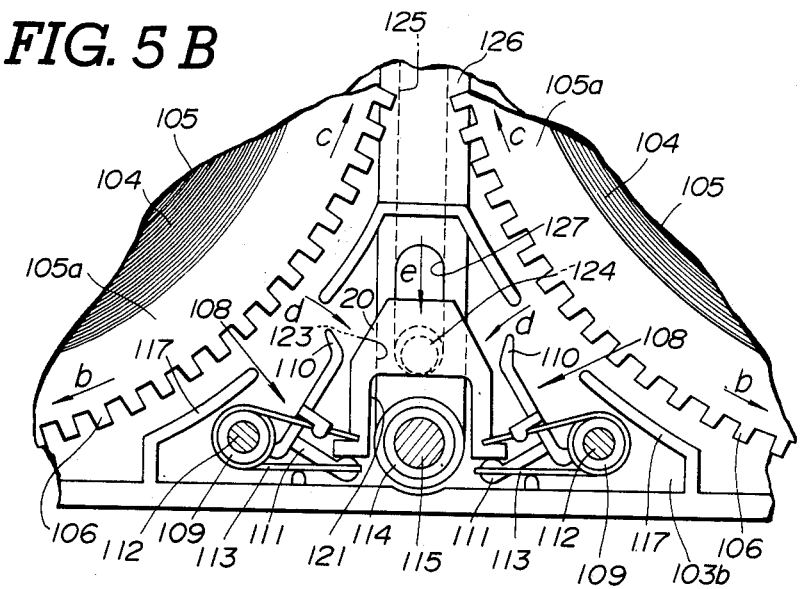
Figure 6:
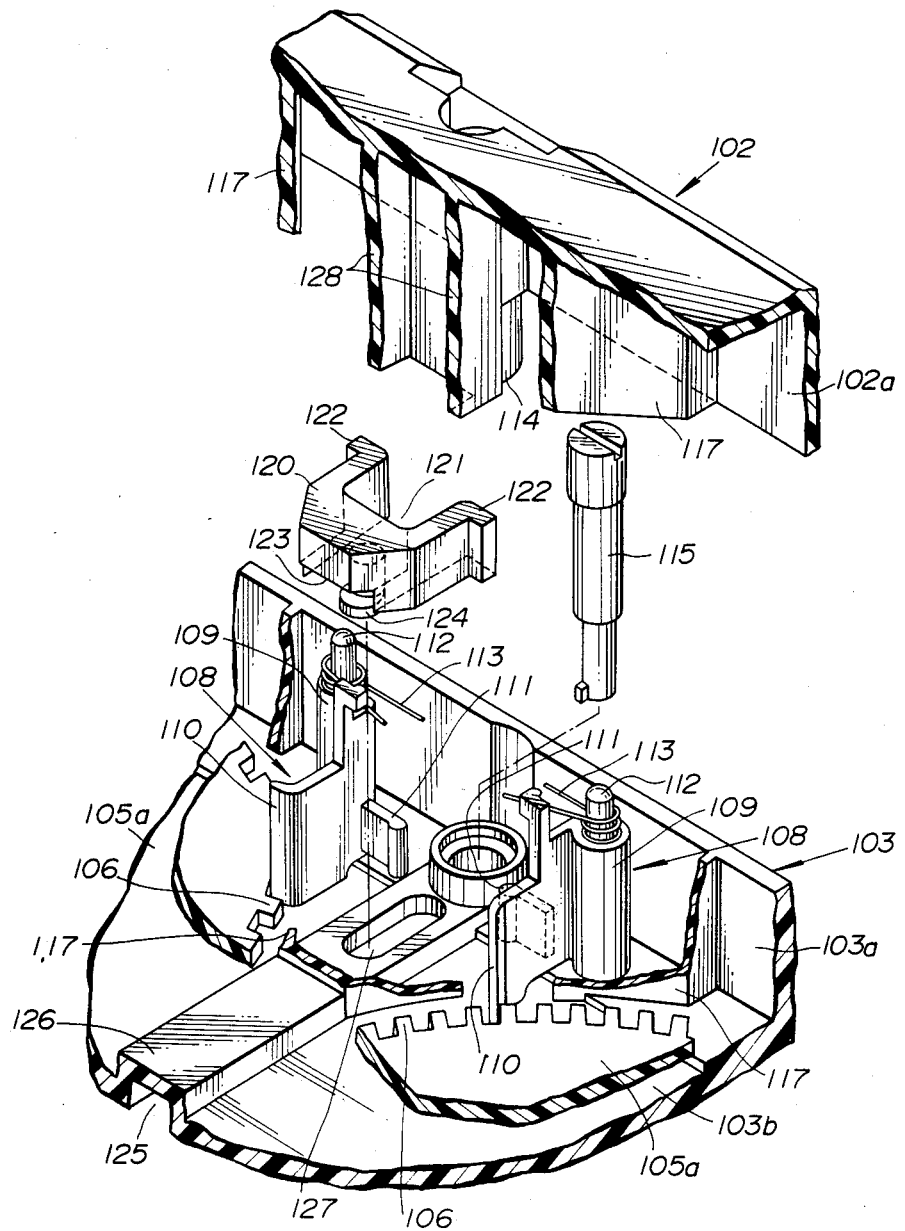
FIG. 6 is an exploded perspective view of the second embodiment of the reel lock mechanism of FIGS. 5A and 5B.

As is well known, the tape reels 105 orbit within reel hub holes formed in the floor 103b of the lower cover 103, as shown in phantom line in FIG. 5A. According to the shown embodiment, in order to assure locking engagement between the locking levers 108 and the locking teeth 106, the transverse strips 111 of the locking levers 108 are separated from the rear end of the tabs 122 of the slider 120 by a front-to-rear clearance W when the tape reels 105 are locatd as shown in solid line in FIG. 5A and the locking claws 110 are in engagement with the locking teeth 106. The clearance W between the transverse strips 111 and the rear edges of the tabs allows pivotal movement of the locking claws 110 in the direction a so as to ensure locking engagement between the locking claws 111 and the locking teeth 106 even when the tape reels 105 are shifted to the position shown in phantom line in FIG. 5A.

It should be appreciated that, in the foregoing second embodiment, the elements appearing on FIGS. 5A, 5B, 6 and 7 but not specifically described hereabove correspond to elements of the first described embodiment. Such elements have been represented by reference numerals that have 100 added to the reference numerals for the corresponding elements in the first embodiment.

Accordingly, the present invention successfully avoids the need for reel lock releasing pins extending from the VTR into the cassette casing by providing the slider with an externally exposed projection which can be operated from the outside of the tape cassette.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic tape cassette comprising:
a substantially rectangular cassette casing having a tape access opening along one side thereof and including a bottom wall having a guide groove in its under surface which extends perpendicular to said one side of the rectangular cassette casing and is substantially centered in respect to the length of said one side;
a pair of tape reels rotatable within said cassette casing at opposite sides of the location of said guide groove and onto which a magnetic tape is wound;
first locking members coupled with said tape reels for rotation therewith;
a pair of second locking members located within said cassette casing in an area adjacent a side of said cassette casing in opposing relation to said one side, and each cooperating with a respective one of said first locking members to establish locking engagement with the latter so as to prevent said tape reels from rotating, said second locking members being pivotable in a first direction to establish said locking engagement and in a second direction to release said locking engagement;
biasing means biasing each of said second locking members in said first direction; and
lock releasing means cooperating with said second locking members to actuate said second locking members in said second direction, said lock releasing means having a projection projecting downwardly through said bottom wall of said cassette casing into said guide groove, said projection being arranged to be engaged by a guide member of a recording and reproducing apparatus which extends into and moves relatively along said guide groove so as to actuate said lock releasing means for moving said second locking members in said second direction simultaneously with the guiding of the tape cassette being loaded into said recording and reproducing apparatus.

2. The tape cassette as set forth in claim 1, which further comprises second lock releasing means for releasing said second locking members from locking engagement with said first locking members in response to rotation of said tape reels in the direction for tape tightening even when the first mentioned lock releasing means is free of the guide member of the recording and reproducing apparatus.

3. The tape cassette as set forth in claim 2, wherein said first lock releasing means is free to move between a first position in which it permits locking engagement between said first and second locking members and a second position in which said second locking members are released from locking engagement with the respective first locking members, and wherein said lock releasing means is moved from said first position to said second position thereof by engagement of said projection with the guide member of the recording and reproducing apparatus during loading of the tape cassette into the latter.

4. The tape cassette as set forth in claim 3, wherein a guide projects from said bottom wall of said cassette casing and guides movement of said first lock releasing means.

5. The tape cassette as set forth in claim 4, wherein said guide is constituted by an impression projecting into the interior of the tape cassette casing and defining said guide groove in the under surface of the bottom wall of said tape cassette casing.

6. The tape cassette as set forth in claim 3, wherein each of said second locking members has an extension opposing an edge of said first lock releasing means facing in a direction away from said one side of the cassette casing, and wherein movement of said first locking releasing means in said direction away from said one side causes pivotal movement of each of said second locking members in said second direction.

7. The tape cassette as set forth in claim 6, wherein each of said first locking members comprises a plurality of locking teeth aligned about the periphery of a lower flange of the respective one of said tape reels.

8. A magnetic tape cassette comprising:
a substantially rectangular cassette casing having a tape access opening along one side thereof and including a bottom wall having a guide groove in its under surface extending perpendicular to said one side and being substantially centered in respect to the length of said one side;
a pair of tape reels rotatably housing within said cassette casing at opposite sides of said groove, each of said tape reels having a hub onto which a magnetic tape is wound and a circular flange with a plurality of locking teeth aligned about its periphery;
a pair of locking levers pivotably about a pair of pivot pins on said bottom wall of said cassette casing at opposite sides of said groove, each of said locking levers pivoting between a locking position in which it fixedly engages said locking teeth of a respective one of said tape reels and an unlocking position wherein it is released from said locking teeth so as to permit rotation of said respective tape reel;
a slider disposed within said cassette casing adjacent an end of said guide groove remote from said one side and having a downward projection extending through a slot in said bottom wall into said groove, said slider being free to move between a first position corresponding to said locking position of said locking levers and a second position corresponding to said unlocking position of said locking levers, said projection being acted upon by an actuation and guiding member in a recording and reproducing apparatus to move said slider to said second position while the tape cassette is guided by said actuation and guiding member in being loaded into the recording and reproducing apparatus.

9. The tape cassette as set forth in claim 8, wherein said second position of said slider is at the end of the stroke thereof remote from said one side of the tape cassette.

10. The tape cassette as set forth in claim 9, which further comprises tape condition indicator means comprising a hollow cylinder located at the end of said guide groove remote from said one side and a plug disposed within said cylinder, said plug being positioned within said cylinder so as to represent the condition of the tape, and said slider has a recess in its edge facing away from said one side of the cassette casing and which accommodates said cylinder when said slider is in said second position.

11. The tape cassette as set forth in claim 10, wherein each of said locking levers has a transverse arm which abuts said edge of said slider for causing pivotal movement of said locking lever from said locking position to said unlocking position as said slider moves to its second position.

12. The tape cassette as set forth in claim 11, wherein said guide groove is defined by an upward impression in said bottom wall, and said slider engages said impression for sliding movement therealong.

* * * * *